United States Patent [19]
Darling

[11] Patent Number: 5,893,402
[45] Date of Patent: Apr. 13, 1999

[54] ROUTER JIG FOR FORMING CORNERS ON DECORATIVE MOLDING

[76] Inventor: Thomas G. Darling, 727 N. 300 E., Decatur, Ind. 46733

[21] Appl. No.: 09/018,088

[22] Filed: Feb. 3, 1998

[51] Int. Cl.$^6$ .................... B27M 3/00; B27C 5/10
[52] U.S. Cl. .................... 144/372; 144/137; 144/144.1; 144/144.52; 144/154.5; 409/130
[58] Field of Search .................... 83/413, 435.1, 83/471.2; 144/136.1, 136.95, 137, 144.1, 144.52, 154.5, 371, 372; 409/125, 130, 181, 182, 190

[56] References Cited

U.S. PATENT DOCUMENTS

| | | | |
|---|---|---|---|
| 3,442,309 | 5/1969 | Jentsch | 144/144.1 |
| 4,743,004 | 5/1988 | Kloss | 269/296 |
| 4,880,042 | 11/1989 | Schafferkotter | 409/130 X |
| 5,094,279 | 3/1992 | Dickey et al. | 144/144 R |
| 5,161,589 | 11/1992 | DiBiagio | 144/134 R |
| 5,363,732 | 11/1994 | Heasley | 83/471.2 |
| 5,667,001 | 9/1997 | Sanger et al. | 144/144.1 |
| 5,778,951 | 7/1998 | Huitsing | 409/130 X |

*Primary Examiner*—W. Donald Bray
*Attorney, Agent, or Firm*—Todd A. Dawson

[57] ABSTRACT

The router jig of this invention uses a preformed negative form of the decorative molding as a guide which directs a router having a straight router bit along the end of a piece of the molding to appropriately form the end for an inside corner. The router jig includes a generally rectangular frame having a router support tray which is slidable relative to the frame. A slot is formed through one side wall of frame. A biased guide pin is connected to the router support tray and is accommodated within the slot of the frame. In use, a router is placed onto the router base and in contact with the guide pin which is extending through the slot. The opposite end of the guide pin is placed in contact with the negative form. With a piece of molding clamped under the frame, the router is turned on and slid with the router base perpendicularly across the molding. As the router is slid relative to the frame and molding, the guide pin is guided along the negative form. Contact between the negative form, the guide pin and the router causes the router to follow the path of the negative form and route a similar profile onto the end of the piece of molding.

9 Claims, 7 Drawing Sheets

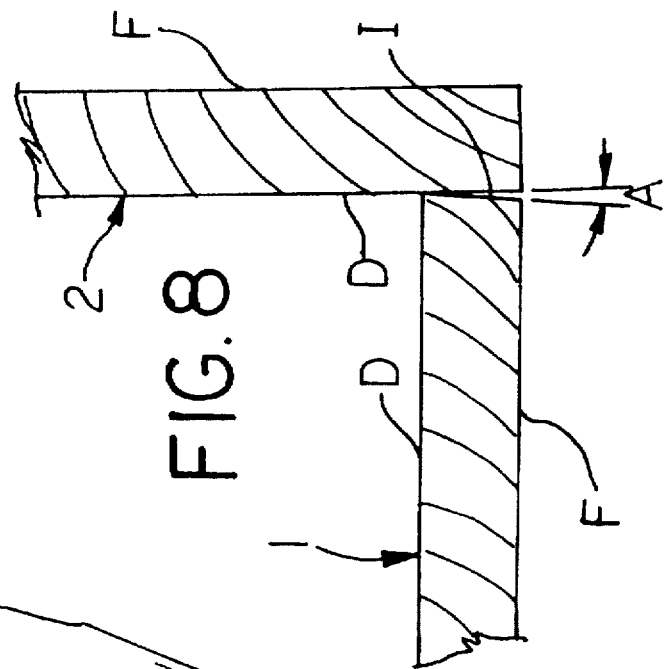
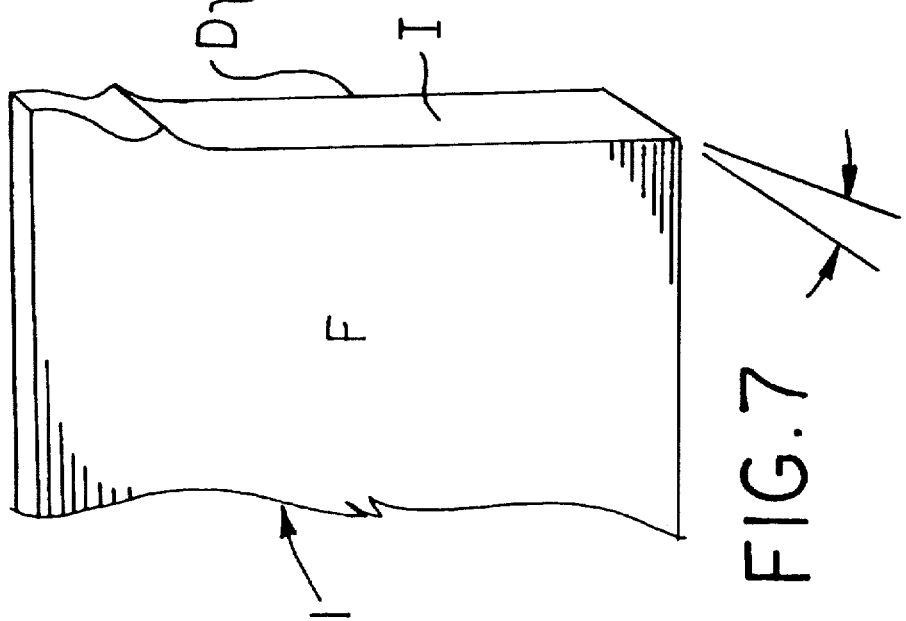
FIG. 7
FIG. 8

5,893,402

ROUTER JIG FOR FORMING CORNERS ON DECORATIVE MOLDING

FIELD OF THE INVENTION

This invention relates to a router jig as used in woodworking and has specific relevance to a router jig used to form inside corners with decorative molding used in construction specifically as base molding or crown molding.

SUMMARY OF THE INVENTION

Decorative molding is used in the construction industry as finish trim on a wall adjacent the either the floor and ceiling or between the floor and ceiling as a "chair rail". Decorative molding placed adjacent the floor is typically referred to as "base molding" and decorative molding placed adjacent the ceiling is typically referred to as "crown molding". Typically the decorative molding has an irregular cross section including a series of ribs and concavities which form an aesthetically pleasing design. To attach the molding to the wall at an inside corner of a room, the carpenter is required to hand carve or use a coping saw to form an end of the molding such that it mates against the molding on the perpendicular wall. Merely cutting the molding at a 45 degree angle would not form a clean corner due to the irregular cross section of most decorative molding. Typically, this requires the carpenter to trace the profile of the molding onto the end of the molding to be cut and repeatedly test fit the piece against the molding already extending into the corner. In a large house with a substantial amount of molding, or when fitting an intricate molding, this process can significantly increase the amount of time required to fully trim out a house with decorative molding.

The router jig of this invention eliminates the problems experienced with hand carving decorative molding for corners and significantly reduces the time involved by using a router to carve an end on decorative molding to fit within a corner. The router jig uses a preformed negative form of the decorative molding as a guide which directs a router having a straight router bit along the end of a piece of the molding. The router jig includes a generally rectangular frame having a router support tray which is slidable relative to the frame. A slot is formed through one side wall of frame. A biased guide pin is connected to the router support tray and is accommodated within the slot of the frame. In use, a router is placed onto the router base and in contact with the guide pin which is extending through the slot. The opposite end of the guide pin is placed in contact with the negative form. With a piece of molding clamped under the frame, the router is turned on and slid with the router base perpendicularly across the molding. As the router is slid relative to the frame and molding, the guide pin is guided along the negative form. Contact between the negative form, the guide pin and the router causes the router to follow the path of the negative form and route a similar profile onto the end of the piece of molding. In this manner, one pass with a router is all that is required to form an appropriate end on the decorative molding for fitting within an inside corner of a room. Therefore, once the router jig of the invention is initially set up, only a few seconds are required to form the molding end appropriately thereby saving substantial time over the prior art hand carved method. The reduction of time required for a carpenter to trim out a house should translate into savings to the home owner.

Accordingly, it is an object of this invention to provide for a novel router jig to route an end of decorative molding for fitting perpendicularly against a second piece of the molding at an inside corner.

Another object of the invention is to provide for a novel router jig wherein the router follows a guide pin in contact with a negative form of decorative molding so that the router reproduces the pattern formed by the negative form on a piece of molding.

Still another object of the invention is to provide for a novel router jig that can be easily adapter to route ends on decorative molding having a wide variety of cross sectional shapes.

Other objects of the invention will become apparent upon a reading of the following description taken along with the accompanying drawings.

BRIEF DESCRIPTION OF THE DRAWINGS

FIGS. 7 and 8 illustrate decorative molding routed using the jig of this invention forming an inside corner.

DESCRIPTION OF THE PREFERRED EMBODIMENT

Figure 1:
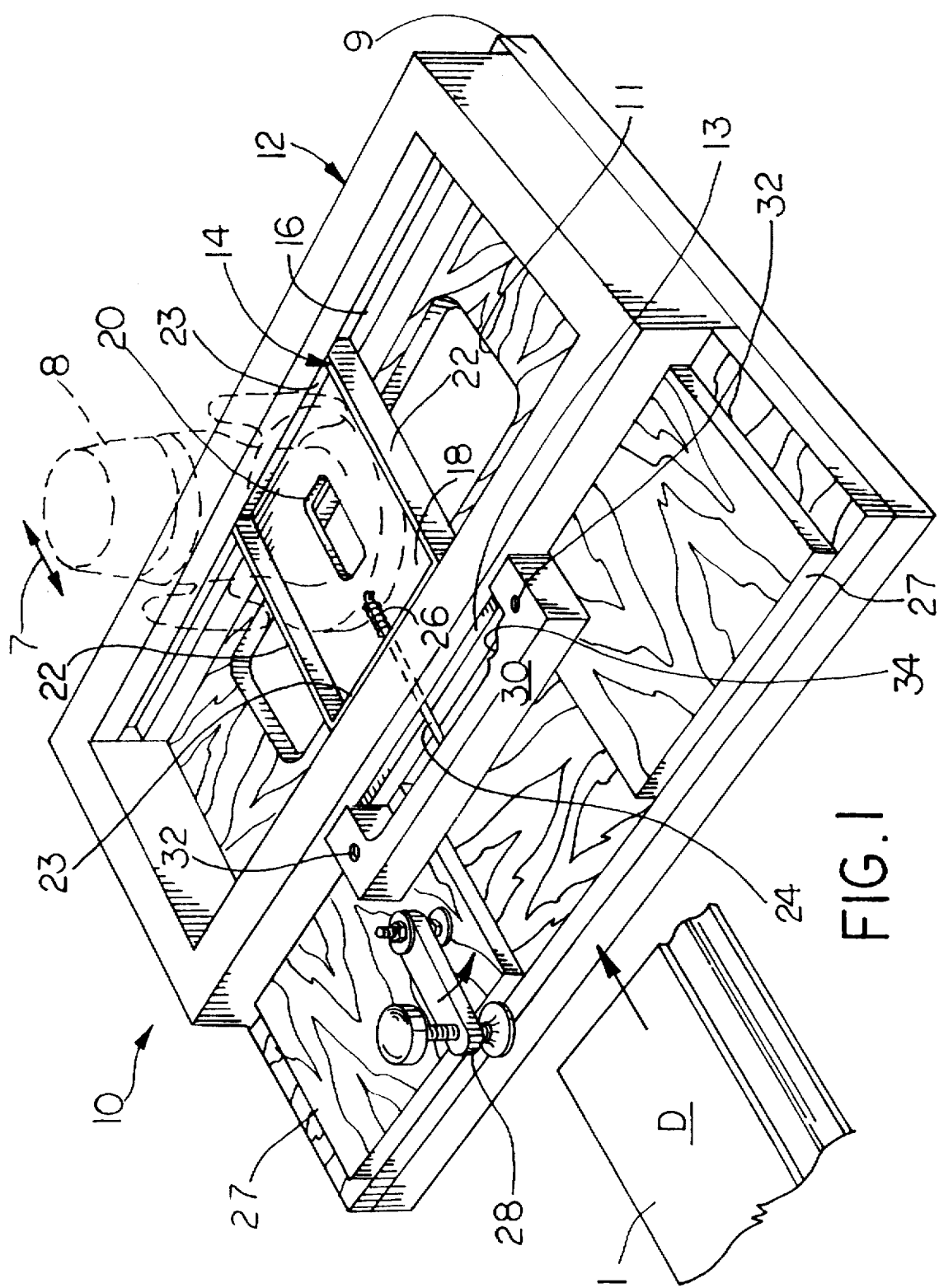
FIG. 1 is a perspective view of the router jig of this invention with a router illustrated in broken lines to illustrate the environment.

The preferred embodiment herein described is not intended to be exhaustive or to limit the application of the invention herein disclosed. Rather, it is intended merely to fully explain the invention so that others skilled in the art might utilize the teachings contained herein.

Initially, to provide a clearer understanding of the particular pieces of molding required to form an inside corner and to thereby enable the explanation of the invention, reference is made to FIGS. 7 and 8. FIGS. 7 and 8 illustrate two pieces of a decorative molding shaped to form an inside corner. Specifically, molding piece 1 and 2 are illustrated. It should be noted that pieces 1 and 2 have substantially similar cross sections. Each piece 1 and 2 has a flat side "F" intended to be placed adjacent the supporting wall (not shown). Further each piece includes a decorative side "D" on an opposite side of side F. Therefore, side D is intended to face into the room and provide the aesthetically pleasing appearance. Each piece 1 and 2 also includes a flat bottom side which is substantially perpendicular to side F. Molding piece 2 terminates in a blunt end substantially perpendicular to side F and as illustrated in FIG. 7, molding piece 1 has been shaped by the invention to terminate in an irregular end "I". As illustrated best in FIG. 8, irregular end I of molding piece 1 is intended to be positioned against side D of molding piece 2, therefore, the irregular end I has been formed by the router jig of this invention to be a substantial negative image of side D. Further, as best illustrated by FIG. 8, the irregular end I has been formed with a small included angle A. As only side D of the molding pieces will be seen by the home owner, forming the irregular end with the small included angle A will assist the carpenter in forming the inside corner in the event that the walls (not shown) do not meet at an exact 90 degrees.

With the above descriptions and definitions in mind, attention is now directed to FIGS. 1–6 which illustrates the router jig 10 of the invention used to form irregular end I on molding piece 1. Router jig 10 includes a generally rectangular and hollow frame 12 having a slot 13 formed through one side thereof. Frame 12 is secured to a base 9 formed from wood by screws (not shown). Base 9 include a large generally rectangular hole 11 formed therethrough as illustrated. A router support tray 14 is carried within frame 12 and slides relative to the base within tracks 16 formed in the interior side walls of frame 12. Router support tray 14 includes a plate portion 18 having a generally rectangular opening 20 therethrough and upturned front and back edges 22 and side edges 23. Preferably, router support tray 14 is formed such that a router 8 (shown in broken lines in FIG. 1) fits between edges 20 without substantial play. However, as will be explained later, the router support tray and frame should be wide enough to permit the router to slide in the direction of arrow 7 between side edges 23. Finally, router support tray 14 includes a guide pin 24 which extends through a hole (not shown) in one side edge 23 and through slot 13 in the frame. Pin 24 is biased toward the interior of router support tray 14 by a helical spring 26. Pin 24 terminates in a blunted end.

A pair of temporary guides blocks 27 are connected to base 9 by screws (not shown) and are spaced relative to one another a distance sufficient to snugly accommodate molding piece 1 in the orientation illustrated in the figures. An additional hold down clamp 28 may be connected to one or more of the guide blocks 27 to assist in temporarily fixing the molding piece 1 to the router jig 10 for forming irregular end 1.

Finally, a negative form 30 is connected by screws 32 to the guide blocks 27 adjacent slot 13 and the frame side wall. Negative form 30 includes an interior surface 34 which is a negative image of the decorative side D of molding piece 1. Negative form 30, and more specifically, the interior surface of negative form 30 may be formed in a variety of methods. For example, the outline of decorative side D of molding piece 1 could be traced onto a block of wood. The carpenter could use a band saw or coping saw and cut along the trace line to form the interior surface 34. However, it is preferred for proper operation of the router jig that the interior surface of the form be extended beyond the top and bottom edges of the actual molding width to provide room for the guide pin and permit the router bit to start and finish past the molding piece 1. Alternatively, a quantity of molding resin could be placed adjacent decorative side D of the molding piece and allowed to harden to form the interior surface 34.

FIGS. 2 through 6 of the included drawings illustrate the use of the router jig of the invention in the formation of the irregular side I on molding piece 1. For clarity, the router will either not be shown or will be shown in broken lines so that the operation of jig can be more clearly illustrated.

Figure 2:
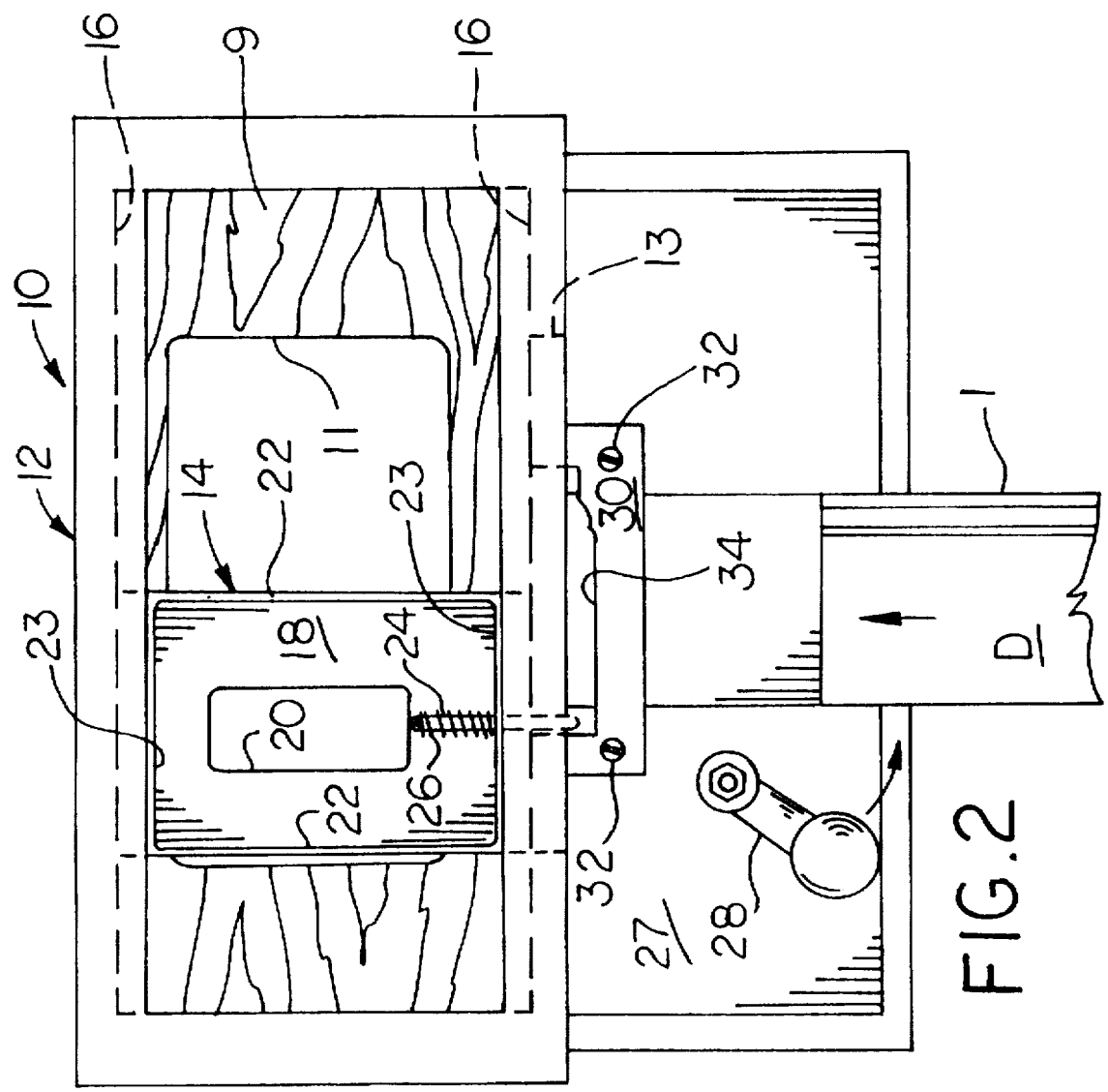
FIGS. 2 through 4 are elevational views of the router jig of the invention in use and illustrating the setup of the jig and the routing of a piece of molding.

FIG. 2 illustrates the position of the router support tray 14 prior insertion of molding piece 1 into the router jig 10. It should be noted that the guide pin is out of alignment with the trough formed by blocks 27. Therefore, with a router carried by the support tray 14, and a straight bit in the router, the router bit would be out of contact with the molding piece as the molding is slid into position.

Figure 3:
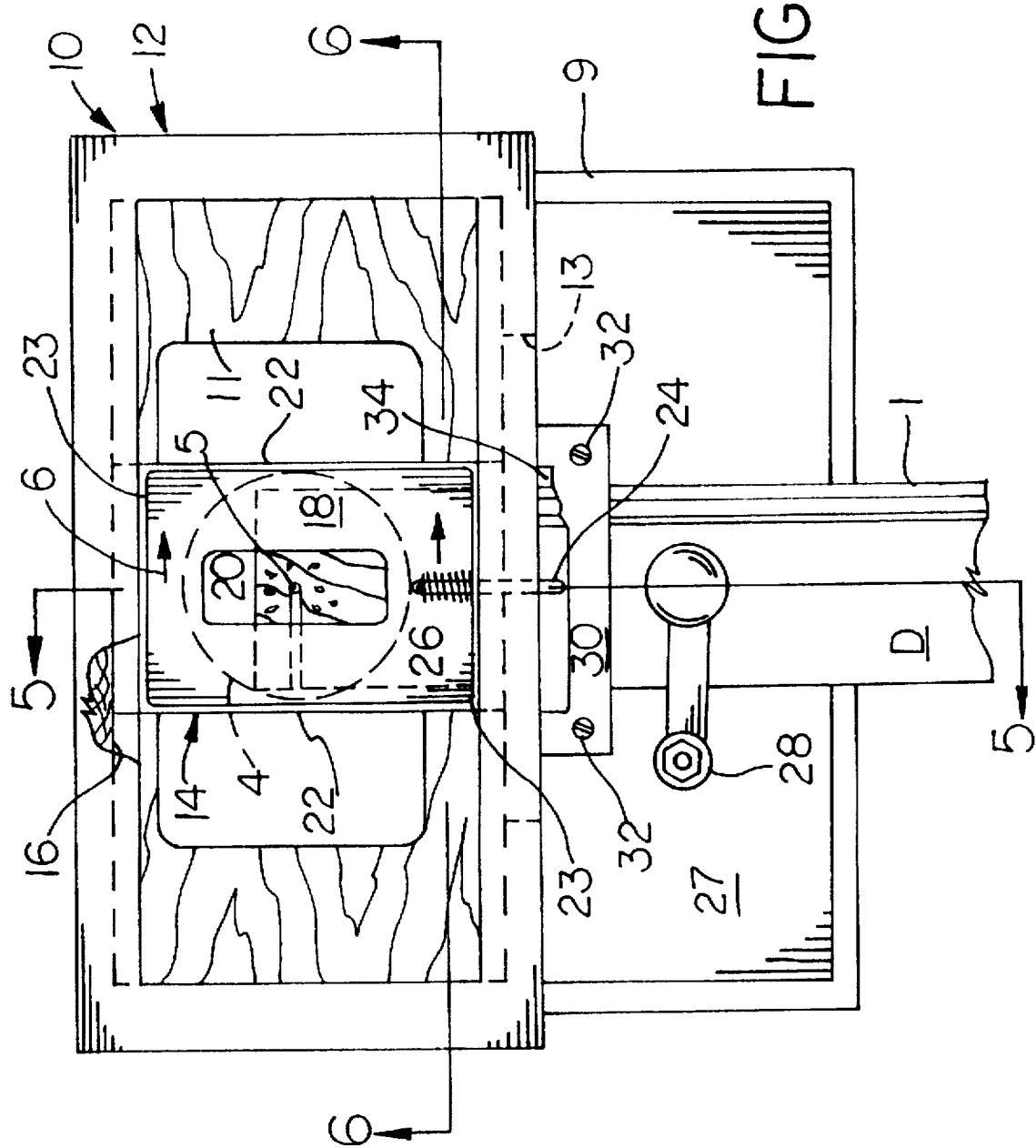
Figure 6:
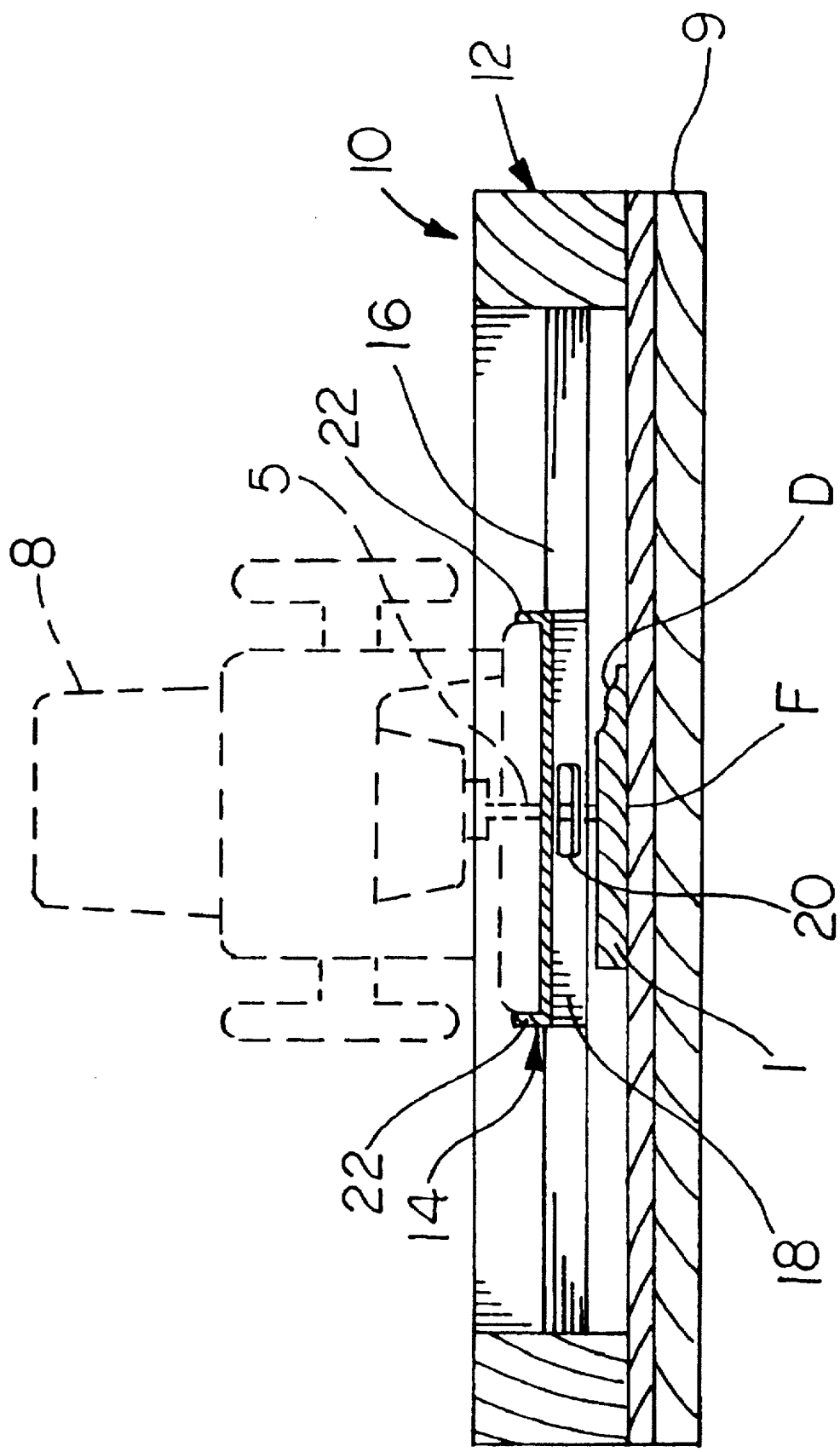
FIG. 6 is a cross sectional view taken along line 6—6 of FIG. 3.

FIGS. 3 and 6 illustrate the same router jig and molding piece with the router beginning to route the irregular end I on the end of molding 1. Flat side F (not shown) is position against base 9 and decorative side D is facing upward. Router support tray 14 with router 8 (illustrated only by a broken circle in FIG. 3) is slid in the direction of arrow 6 with the router running and turning router bit 5. As the tray 14 and router are slid in the direction of arrow 6, the carpenter maintains contact between the periphery of the router (illustrated by broken circle 4 in FIG. 3), the guide pin 24 and the interior surface 34 of negative form 30.

Figure 4:
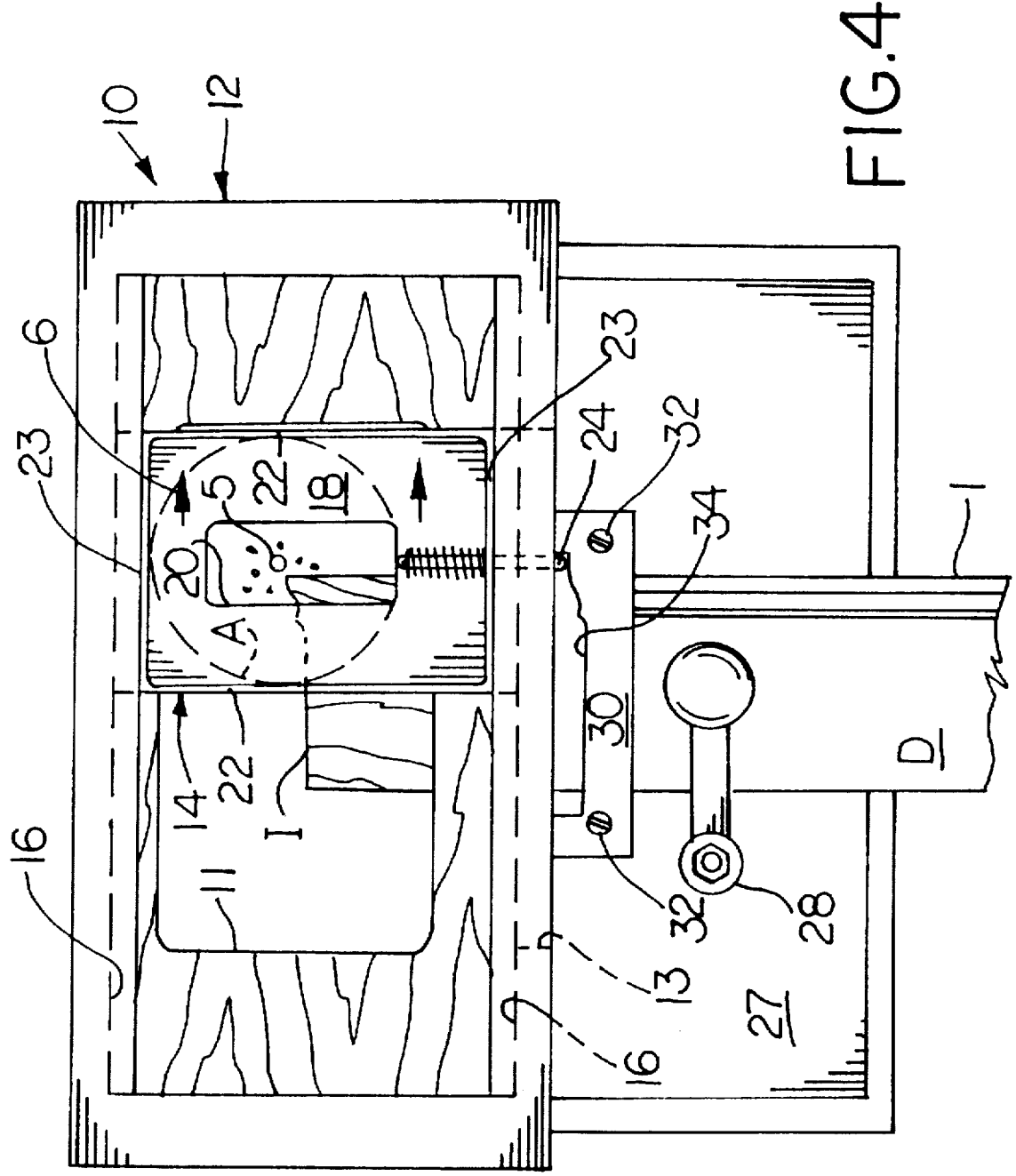

FIG. 4 illustrates a continuation of the sequence of FIG. 3, again, with the outer periphery of the router illustrated only by broken circle 4. It should be noted that as the support tray 14 and router were slid in the direction of arrow 6 from the position illustrated in FIG. 3 to the position illustrated in FIG. 4 that the router was required to slide within support tray 14 in a direction perpendicular to arrow 6 as the guide pin encountered the various irregular curves of the interior surface 34 of the negative form 30. Finally, it should be noted that since the negative form 30 is slightly larger than the actual molding piece 1, bit 5 was allowed to pass completely through the molding piece to fully form irregular end I on molding piece 1. At this point, the irregular end I of molding piece 1 is completely formed and the user may release clamp 28 and fit molding piece 1 against piece 2 to form a corner as illustrated in FIG. 9.

Figure 5:
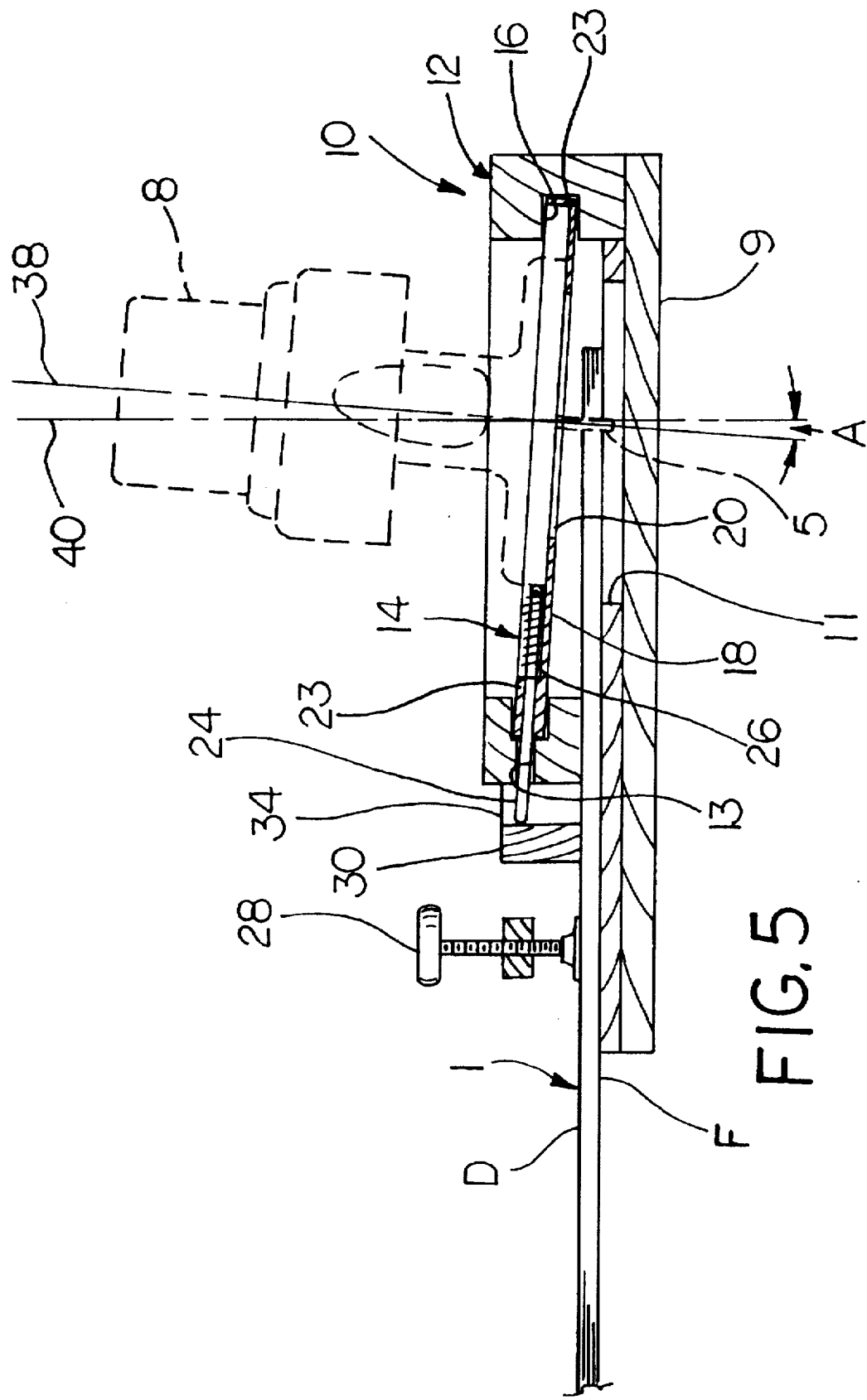
FIG. 5 is a cross sectional view taken along line 5—5 of FIG. 3.

As mentioned earlier, it is preferred to form the irregular end I of molding piece 1 with a small included angle to assist the carpenter in fitting the molding into a corner that may not be exactly 90 degrees. FIG. 5 illustrates the manner in which the small included angle is formed in irregular end I. Specifically, it can be seen in FIG. 5 that the tracks 16 formed in the longitudinal side edges of frame 12 are offset relative to one another such that the router tray carried by the slots is positioned at a small angle relative to base 9. The axis of the router 8 and bit 5 (represented by broken line 38) are, therefore, positioned at a small angle A relative to the vertical axis of the router jig (represented by broken line 40). As the router bit 5 passes through molding I to form irregular end 1, as explained above, the offset between the vertical axis of the jig and the axis of the router and bit is transferred to the end I (see FIG. 8).

It should be understood that the invention is not to be limited to the precise details above, but rather may be modified within the scope of the appended claims.

I claim:

1. A jig for guiding a powered router and router bit across a piece of wood to form an irregular end thereon, said jig including, a frame a router support tray carried by said frame, wherein said router support tray is slidable relative to said frame from a first position toward a second position, a guide pin carried by said router support tray having one end configured for contact with a peripheral edge of a powered router, said guide pin extending through a slot in said frame, and a form connected adjacent to said frame in alignment with said slot such that a second end of said pin slidingly contacts in interior surface of the form.

2. The jig of claim 1 wherein said frame includes a pair of parallel channels on opposing side walls, said router support tray being positioned within said channels and slidable within said channels relative to said frame.

3. The jig of claim 1 wherein the router support tray includes a central opening therein for accommodating a router bit therethrough.

4. The jig of claim 1 wherein the router support tray is generally rectangular.

5. The jig of claim 1 wherein said guide pin carried by said router support tray is biased away from said form.

6. The jig of claim 2 wherein said pair of parallel channels in said frame are offset from one another relative to a vertical axis of said frame such that said router support plate is positioned at an angle relative to the vertical axis of said frame.

7. A jig for guiding a powered router and router bit across a piece of wood to form an irregular end thereon, said jig including, a frame having a pair of parallel channels on opposing side walls, a generally rectangular router support tray having a central opening therein for accommodating a router bit therethrough, said router support tray being carried by said frame and extending into and between said channels wherein said router support tray is slidable within said channels relative to said frame from a first position toward a second position, a guide pin carried by said router support tray having one end configured for contact with a peripheral edge of a powered router, said guide pin extending through a slot in said frame, and a form connected adjacent to said frame in alignment with said slot such that a second end of said pin slidingly contacts in interior surface of the form, wherein said guide pin carried by said router support tray is biased away from said form.

8. The jig of claim 7 wherein said pair of parallel channels in said frame are offset from one another relative to a vertical axis of said frame such that said router support plate is positioned at an angle relative to the vertical axis of said frame.

9. A method of forming an irregular end in a piece of decorative molding for forming an inside corner with a similar piece of decorative molding, said method including the steps of:

forming a negative form of said decorative molding wherein said form includes an interior surface which is a negative of an exterior surface of the decorative molding;

providing a router frame providing a router support tray carried by said frame, wherein said router support tray is slidable relative to said frame from a first position toward a second position, providing a guide pin carried by said router support tray having one end configured for contact with a peripheral edge of a powered router, said guide pin extending through a slot in said frame;

providing a negative form connected adjacent to said frame in alignment with said slot such that a second end of said pin slidingly contacts in interior surface of the form;

placing a router onto said router support tray such that a router bit extends through a central opening in said router support tray;

placing a piece of decorative molding in said router jig such that a portion of said molding is in alignment with said router bit, said decorative molding having an exterior surface substantially matching the interior surface of said negative form, rotating said router bit and sliding said router support tray and router relative to said frame from a first position spaced from a lateral edge of said molding toward a second position on an opposite edge of said decorative molding, wherein as said router and support tray is slid in a first direction from said first position toward said second position, said guide pin is positioned between the interior surface of the negative form and a peripheral edge of the router, said guide pin follows the interior surface of said negative form as said support tray and router are slid from the first position toward the second position to cause said router to slide relative to said router support tray in a second direction perpendicular to said first direction.

\* \* \* \* \*